United States Patent [19]

Yamaguchi et al.

[11] Patent Number: 4,759,599
[45] Date of Patent: Jul. 26, 1988

[54] OPTICAL CONNECTOR

[75] Inventors: Yasuhiro Yamaguchi, Yokohama; Kenichi Donuma, Koshigaya; Yasuhiro Ando, Tokyo; Shuichiro Inagaki, Yokohama, all of Japan

[73] Assignees: Kabushiki Kaisha Toshiba, Kawasaki; Nippon Telegraph and Telephone Corporation, Tokyo, both of Japan

[21] Appl. No.: 943,769

[22] Filed: Dec. 19, 1986

[30] Foreign Application Priority Data

Dec. 24, 1985 [JP] Japan ................. 60-289151

[51] Int. Cl.⁴ .............................................. G02B 6/38
[52] U.S. Cl. ................................ 350/96.21; 350/96.2
[58] Field of Search ................. 350/96.2, 96.21, 96.22

[56] References Cited

U.S. PATENT DOCUMENTS

| 4,681,398 | 7/1987 | Bailey et al. | 350/96.2 |
| 4,682,847 | 7/1987 | Moore et al. | 350/96.2 |
| 4,682,848 | 7/1987 | Cairns et al. | 350/96.2 |

FOREIGN PATENT DOCUMENTS 7315387 12/1983 China .
70379 9/1985 China .

OTHER PUBLICATIONS

Suematsu, Y., Optical Devices & Fibers, 1982, pp. 154–158, Japan Annual Reviews in Electronics, Computers and Tele.

Primary Examiner—Gene Wan
Attorney, Agent, or Firm—Cushman, Darby & Cushman

[57] ABSTRACT

An optical connector includes a plug and an adaptor to which the plug is to be connected. The adaptor is formed with a plug body fitting portion and a holder fitting portion. The plug has a plug body to which a optical fiber cable is fixed. A floating holder is arranged in the plug body to be movable in any direction with respect to the plug body. An end of the optical fiber of the cable is attached to a ferrule which is supported by the holder. When the plug is connected to the adaptor, the plug body is fitted to the plug body fitting portion and the holder to the holder fitting portion. At this time, the plug body is locked to the plug body fitting portion by a lock mechanism, and the holder is locked to the holder fitting portion by engaging projections on the holder and engaging holes which are formed in the holder fitting portion and engaged with the projections.

13 Claims, 4 Drawing Sheets

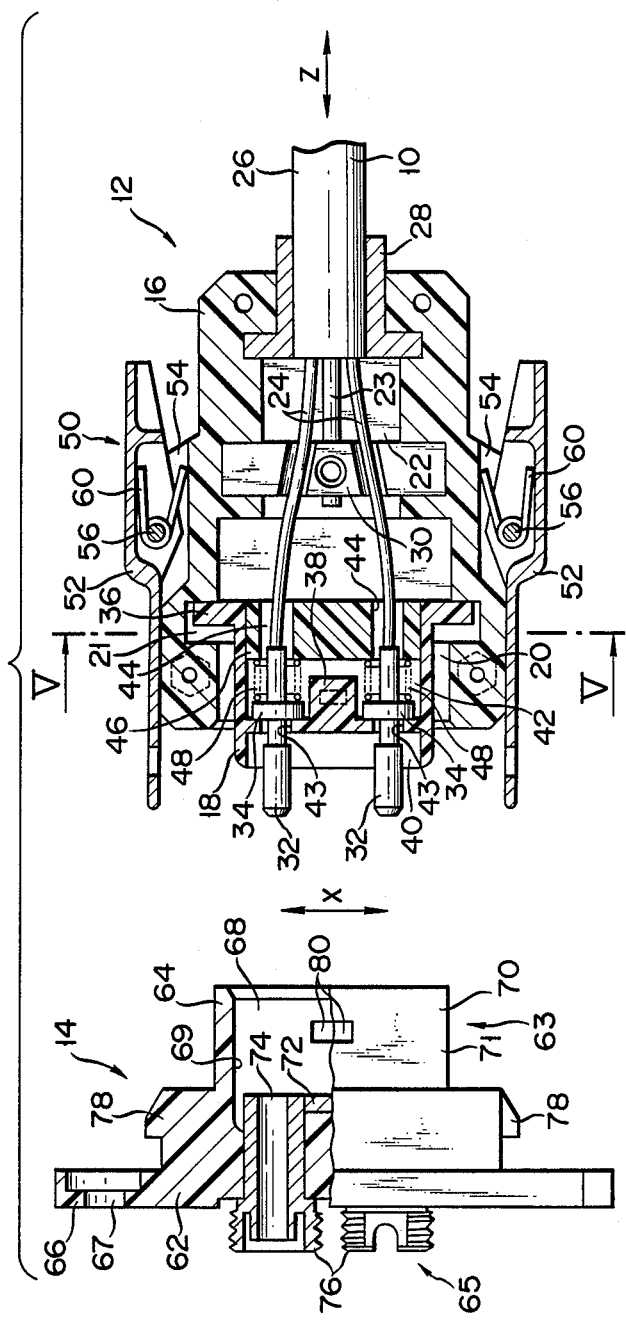
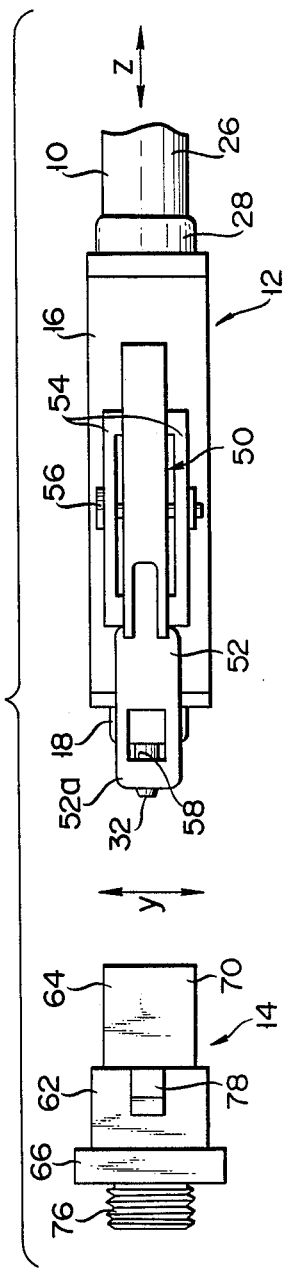
FIG. 1
FIG. 2

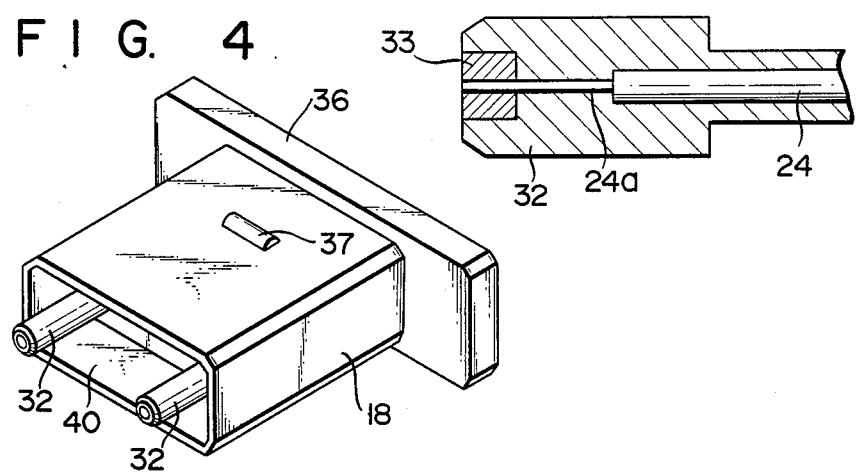
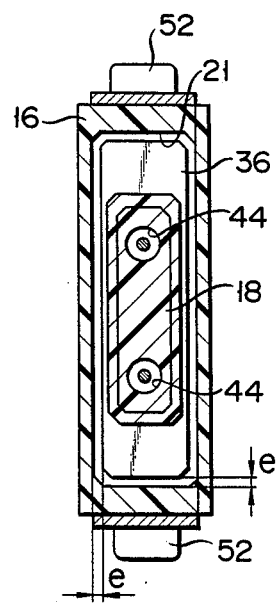
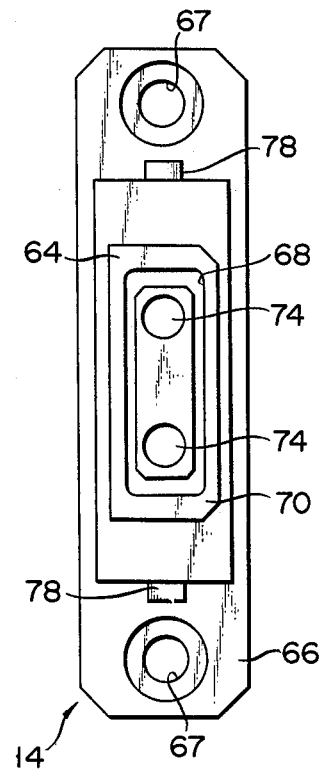

OPTICAL CONNECTOR

BACKGROUND OF THE INVENTION

1. Field of the Invention

This invention relates to an optical connector for optical signal transmission.

2. Description of the Prior Art

An optical connector for connecting optical fibers has a plug and an adaptor. The plug has a ferrule attached to one end of an optical fiber and can be coupled to the adaptor. When the plug is connected to the adaptor, the ferrule contacts the ferrule of another plug attached to the adaptor, thereby connecting the optical fiber to the other optical fiber fastened to the other plug. A lock having screws and a lock having levers are known as devices for connecting a plug to an adaptor.

The lock with screws can firmly attach a plug to an adaptor by turning the screws. Once the plug has been attached to the adaptor, any vibration or shock applied to the plug or the optical fiber, can hardly act on the ferrule. This lock is, however, disadvantageous in that a long time is usually required to turn the screws to fasten the plug to the adaptor.

In contrast, the lock having levers is easy to use. It can attach a plug to an adaptor only by rotating or pushing the levers. The levers are rotatably coupled to both sides of the plug. Each lever has a square hole in the tip. The adaptor has projections which can fit into the square holes of the levers. After the plug has been brought into contact with the adaptor, the levers are rotated until the projections fit into the square holes, whereby the plug is connected to the adaptor. This lock has also a drawback. Since each projection fits in the square hole of the lock lever when the lever is rotated, the hole must be larger than the projection. Therefore, after the plug has been connected to the adaptor, a gap, through narrow, is left between the projection and the hole. When a force acts on the plug or the optical fiber coupled to the plug, along the axis of the ferrule, the plug inevitably move for the distance equal to this gap along the axis of the ferrule. This movement of the plug deteriorate the optical connection of the ferrule and another ferrule, though either ferrule is urged by a coil spring and stays in a "floating" condition as long as the plug is fastened to the adaptor. Further, when a force acts on the plug at right angles to the axis of the ferrule, the plug is moved in the direction the force is applied, inevitably deteriorating the optical connection between the two ferrules. In the worst case, the ferrules move away from each other for so long a distance that an optical signal fails to reach one ferrule from the other, resulting in an instantaneous interruption of optical signal communication. In short, the lock having levers is not a reliable connecting apparatus.

As has been stated, either type of a lock for connecting a plug to an adaptor has an inherent drawback. An optical connector, which can be easily operated and can reliably achieve for optical signal transmission is now greatly demanded.

SUMMARY OF THE INVENTION

This invention has been made in view of the above consideration, and is intended to provide an optical connector which allows easy connection of an optical connector plug and an optical connector adaptor and which also allows optical transmission with a high reliability.

To achieve the above object, according to the optical connector of this invention, the connector plug has a plug body and a floating holder which is located in the plug body to be freely movable with respect to the plug body, and to this floating holder is attached a ferrule which holds an optical fiber at its center. The floating holder is provided with an engaging section which engages with the fitting section of the adaptor when the plug is connected to the adaptor. Such lock mechanism having the engaging section and fitting section is so called "half-lock" mechanism. The optical connector is also provided with a lock mechanism for locking the plug body in the fitted condition when the plug body is fitted to the adaptor.

According to this invention constructed as stated above, even if an external force is applied to the optical fiber cable or to the connector plug body, no external force is transmitted to the floating holder which is positioned in the plug body in a floating condition in relation to the plug body. Therefore, no external force is applied on the ferrule which is supported by the floating holder. This prevents the instantaneous interruption phenomenon in which the ferrules fitted to each other within the adaptor are separated to cause instantaneous interruption of optical signals.

BRIEF DESCRIPTION OF THE DRAWINGS

FIGS. 1 to 8 show an optical connector according to an embodiment of the present invention, in which FIG. 1 is a partially broken plan view of the connector, in the state that a plug and an adaptor are separated, FIG. 2 is a side view of the connector in the state shown in FIG. 1, FIG. 3 is a sectional view of a ferrule, FIG. 4 is a perspective view of a floating holder, FIG. 5 is a sectional view taken along line V—V of FIG. 1, FIG. 6 is a front view of the adaptor, FIG. 8 is a plan view of the optical connector in the state that the plug is connected to the adaptor.

DETAILED DESCRIPTION OF THE PREFERRED EMBODIMENT

Figure 7A:
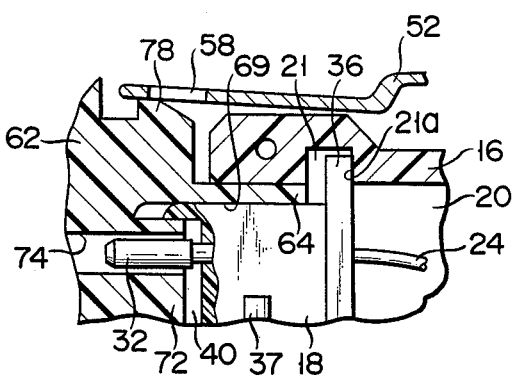
FIGS. 7A to 7C are partial sectional views showing the steps of connecting the plug to the adaptor.

An embodiment of this invention will now be described in detail with reference to the accompanying drawings.

As shown in FIGS. 1 and 2, an optical connector is provided with an optical connector plug 12 attached to the end of optical fiber cable 10, and an optical connector adaptor 14 to which the plug 12 is to be connected.

Plug 12 has a plug body 16, in the form of thin box, fixed to cable 10, and a floating holder 18 so arranged within the plug body to allow it to float. On plug body 16 are formed holder receiving space 20 which is open to the front end of the body and has a rectangular cross section, and fiber receiving space 22 which is open to the back end of the body and communicates with space 20. An inner surface of body 16 which defines space 20 is formed with regulating groove 21 which extends throughout the entire periphery of the inner surface. Regulating groove 21, like space 20, has a rectangular cross section. On the rear end of plug body 16 is fixed optical fiber cable 10. Cable 10 includes tension wire 23 which is formed of φ1.2 mm steel wire, for instance, and embedded in polyethylene resin, two nylon jacketed fibers 24, and sheath 26 made of PVC (polyvinylchloride) covering wire 23 and fibers 24. An end portion of sheath 26 is fixed to plug body 16 by means of bush 28, and is located at the rear end of space 22. Wire 23 and optical fiber 24 extend frontward from the fixed end of sheath 26, and the wire is fixed to body 16 through wire holder 30 located within space 22. Each optical fiber 24 extends into holder receiving space 20, and ferrule 32 is fixed to the extended end of each fiber 24. As shown in FIGS. 1 and 3, ferrule 32 is formed of stainless steel, for instance, into a substantially cylindrical shape with a high dimensional accuracy. Fiber 24 is forcibly inserted into ferrule 32 and extends to the end of the ferrule. In FIG. 3, reference numeral 24a represents a bare fiber of fiber 24 formed of quartz and numeral 33 a ceramic tip with a capillary. Annular stopper 34 is provided on the outer periphery at the middle portion of each ferrule 32.

As shown in FIGS. 1, 4 and 5, floating holder 18 is formed into a rectangular cylindrical shape, and has a cross section which is similar to the cross section of holder receiving space 20 and smaller than that of space 20. In addition, holder 18 has rectangular flange 36 formed, as a regulating section, on the outer periphery at the rear end of holder 18. This flange 36 has a cross section which is similar in shape to that of regulating groove 21 of plug body 16 and smaller than that of the groove. Also, flange 36 is thinner than the width of regulating groove 21. Projections 37 for engagement are formed on both the upper and lower surfaces of holder 18. Holder 18 is arranged in receiving space 20 of body 16 with flange 36 being located within regulating groove 21. Since holder 18 and flange 36 have cross sections smaller than those of space 20 and regulating groove 21, respectively, the holder is so arranged within space 20 as to allow its free movement in x, y and z directions.

Within holder 18 is formed partition wall 38 which divides inside the holder into adaptor fitting recess 40 which is open to the front end of the holder, and retaining element fitting recess 42 which is open to the rear end of the holder, i.e., on the side of flange 36. A pair of through-holes 43 are formed in partition wall 38 and extend along the axis of holder 18. The distal end portions of ferrules 32 are inserted into through-holes 43 to be slidable along the respective axis, and project frontward from holder 18. Retaining element 46 formed with a pair of fiber insertion holes 44 is fitted into recess 42. Into each insertion hole 44 are loosely inserted the proximal end portion of corresponding ferrule 32 and optical fiber 24. Coil spring 48 is arranged around the proximal end portion of each ferrule 32, and one end of the spring is in contact with stopper 34 of the ferrule and the other end is in contact with retaining element 46. By spring 48, ferrule 32 is thus urged frontward of holder 18 with force of about 800 to 1200 g, and stopper 34 is held in contact with partition wall 38. As in the above manner, each ferrule 32 is pressed by spring 48, and is allowed to move backward along the axis of ferrule 32 until spring 48 completely contracts. Each ferrule 32 is prevented from rotating by an anti-rotation pin which is not shown. While holder 18 is held within plug body 16, each fiber 24 is loose between ferrule 32 and the end of cable sheath 26.

Also, as shown in FIGS. 1 and 2, on plug body 16 is provided lock mechanism 50 for locking plug 12 and adaption 14 in a connected state when plug 12 is connected to adaptor 14. Lock mechanism 50 has a pair of lock levers 52 which are rotatably supported on both sides of body 16, respectively. More detail, upper and lower support peices 54 extend from each said of body 16, and supporting shaft 56 is rotatably provided between the support peices. Lock lever 56 is rotatably supported on shaft 56. Distal end portion 52a of each lock lever 52 projects frontward from plug body 16. End portion 52a is formed with square hole 58 as an engaging section. Torsion spring 60 is arranged around each shaft 56, and lock levers 52 are urged by springs 60 toward body 16, that is, urged in that direction in which end portions 52a of levers 52 come to close to each other.

As shown in FIGS. 1, 2 and 6, adaptor 14 is provided with body 62 of a rectangular pillar shape. On the front of body 62 is provided first connecting portion 63 to which plug 12 is to be connected. On the back of body 62 is provided second connecting portion 65 to which another optical connector plug (not shown) is to be connected. First connecting portion 63 has rectangular fitting frame 64 projecting from the front of body 62. On the end edge at the back side of body 62 is formed flange 66 in which are formed a pair of fixing holes 67.

The inner surface of frame 64 defines holder fitting recess 68 into which floating holder 18 of plug 12 is fitted. Recess 68 has a cross section of the same shape as that of holder 18 and slightly larger than the latter. The inner surface of frame 64 serves as guide surface 69 for guiding insertion of holder 18 into fitting recess 68. Frame 64 has a profile which is similar to the cross section of holder receiving space 20 of plug body 16 to allow its insertion into space 20. In other words, frame 64 is so formed that plug body 16 can be fitted on frame 64, and the frame itself forms fitting section 70. The outer surface of frame 64 forms guide surface 71 for guiding the fitting of plug body 16 onto the frame. In the upper and lower walls of frame 64 are formed engaging holes 80 to which engaging projections 37 of floating holder 18 are fitted, respectively. On the bottom of recess 68 is formed projection 72 which is to be fitted to recess 40 of floating holder 18. A pair of parallel ferrule insertion holes 74 are formed in body 62. Each insertion hole 74 has an end open to projection 72, i.e., the bottom of fitting recess 68, and the other end open to the back of body 62. A pair of annular threaded portions 76 constituting second connecting portion 65 are formed on the back of body 62. Each threaded portion 76 communicates with the other end of the corresponding insertion hole 74. A single core type optical connector plug (not shown) is to be connected to each threaded portion 76. On each side of body 64 is formed projection 78 for engaging with square hole 58 of corresponding lock lever 52 when plug 12 is connected to adaptor 14. Each insertion hole 74 is machined with high accuracy in its inner diameter so that ferrule 32 inserted into it does not move inside it.

The connection of the optical connector having the above structure is performed in the following manner.

Figure 7B:
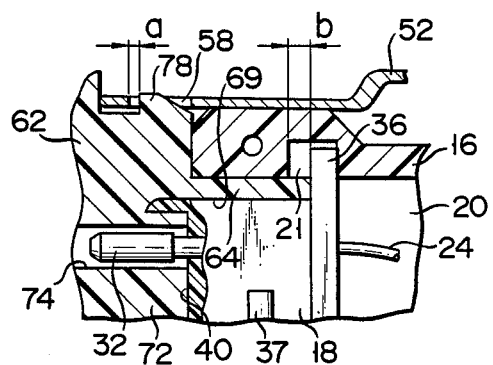
Figure 8:
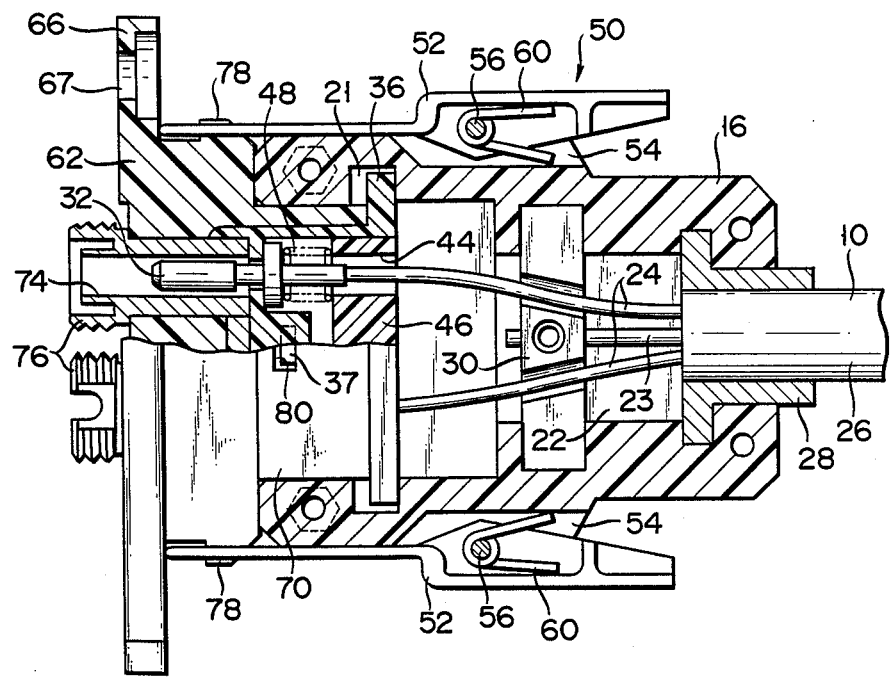

As shown in FIG. 7A, first, plug 12 is inserted to adaptor 14 while the end of floating holder 18 is fitted to holder fitting recess 68 of adaptor 14. When making insertion, the rear surface of flange 36 of holder 18 comes into contact with rear surface 21a of regulating groove 21 on plug body 16, and the holder is pushed by this rear surface 21a. In accordance with the insertion of plug 12, frame 64 of adaptor 14 goes into holder receiving space 20 of plug body 16, and at the same time, projection 72 on adaptor 14 goes into fitting recess 40 formed on the end of holder 18. The distal end of each lock lever 52 on plug 12 comes into contact with corresponding projection 78 on adaptor 14, and the levers are rotated in the direction away from each other. FIGS. 7B and 8 show the condition immediately after plug 12 is connected to adaptor 14. When plug 12 is completely inserted, flange 36 of holder 18 comes into contact with the end of fitting frame 64, and projection 72 on adaptor 14 is fitted in recess 40 of the holder. As a result, ferrules 32 are inserted into ferrule insertion holes 74 of adaptor 14, respectively. With this condition, moreover, engaging projections 37 on holder 18 engage with engaging holes 80 of engagement frame 64, respectively, thereby holding the holder within the frame. Simultaneously, projections 78 on adaptor 14 are inserted into square holes 58 of lock levers 52, respectively, thereby locking plug body 16 to adaptor 14. In this state gap a is formed between the edge of square hole 58 and projection 78, and gap b larger than gap a is formed between the front surface of flange 36 of holder 18 and the front surface of regulating groove 21 which faces the former.

Figure 7C:
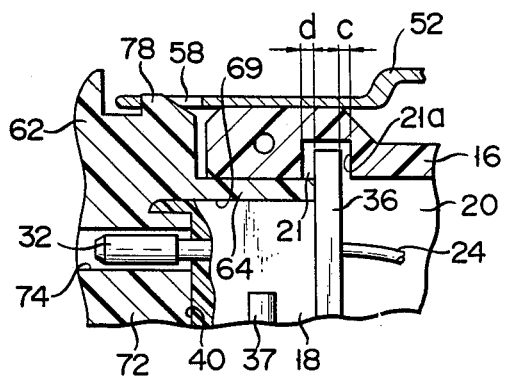

FIG. 7C shows the condition where an external force along direction z is applied on plug body 16 or optical fiber cable 10 to pull it backward. In this case, plug body 16 moves until the edge of square hole 58 of lock lever 52 comes into contact with projection 78 on adaptor 14, and its further movement is prevented by the lock levers. In this state, gap c with the same width as gap a is defined between the rear surface of flange 36 and rear surface 21a of regulating groove 21. Between the front surface of flange 36 and the front surface of groove 21, gap d is left, which is as large as gap b minus moving distance of flange assembly 16. Thus, even if plug body 16 moves as mentioned above, the plug body does not contact with flange 36, i.e., floating holder 18, and thus external force applied on the plug body is not transferred to the holder. Accordingly ferrules 32 is not influenced by external force. Sheath 26 of optical fiber cable 10 is fixed to plug body 16 by means of bush 28, and wire 23 embedded in the cable is fixed to body 16. An external force applied to cable 10, therefore, is transferred to plug body 16 via bush 28 and wire 23, but not to floating holder 18 via optical fiber 24.

Even if plug body 16 moves in the directions of x and y, holder 18 is not moved. As it is clear from FIG. 5, gap e is defined between the outer surface of flange 36 of holder 18 and the inner surface of regulating groove 21 of plug body 16. This gap e prevents the movement of plug body 16 in the directions of x and y from being transferred to holder 18.

An impact test was conducted, applying an imapct of 100 G for 5 ms on the optical connector in the x-direction, y-direction, and z-direction, while keeping plug 12 coupled to adaptor 14, and also maintaining single-fiber connector plugs (not shown) connected to threaded portions 76. The test showed that no interruption of transmission of optical signals, which amount to more than 0.03 dB and are longer than 60 msec., took place.

In the optical connector described above, holder 18 holding the ferrules, so to speak, floats, not being fixed to plug body 16, and can freely move. Hence, in the state that holder 18 is fitted to frame 64 and locked thereto by the half lock mechanism, even if an external force, such as an impact, is applied to plug body 16 or the optical fiber, it does not act on the ferrules. No interruptions of transmission of optical signals occur.

The optical connector can, therefore, ensure a reliable optical signal transmission. It is not only easy to operate, but also mechanically strong against vibration, impact, etc., and can therefore provide a very reliable optical signal transmission.

The present invention is not limited to the embodiment described above. Various changes and modifications can be made within the spirit and scope of the present invention.

For instance, the invention can apply to connectors for connecting one optical fiber to another, or more than two optical fibers to the same number of optical fibers, instead of connecting only two optical fiber to other two as practiced in the embodiment. Further, the holder can have holes (i.e., engaging section), and the adaptor can has projections (i.e., stopping section). In this case, too, the same advantages can be obtained as in the embodiment wherein the holder has projections and the adaptor has holes. Further, in order to attain the same advantages, the holder can be provided with magnets, and the adaptor can be provided with magnetic parts, or vice versa.

Moreover, it suffices to replace the regulating portion of the floating holder with a projection, and the regulating recess of the plug body with hole, in order that the holder is prevented from dropped from the plug body and can freely move.

Still further, the lock mechanism for locking the plug body to the adaptor can be comprised of projections provided on the plug body, and lock levers provided on the adaptor. Alternatively, the mechanism can be so constructed that it can be operated by a single touch.

Figure 9:
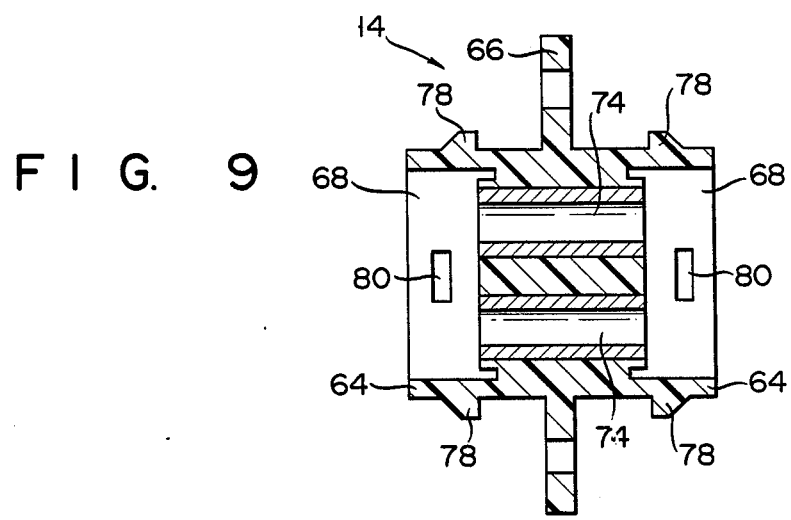
FIG. 9 is a sectional view showing a modification of the adaptor.

In the embodiment, the adaptor has the first connecting section to which a two-fiber plug can be coupled, and the second connecting section to which a single-fiber plug can be coupled. Instead, as is shown in FIG. 9, the second connecting section can have the same structure as the first connecting section, so that a two-fiber plug can be connected to it.

Furthermore, an alignment sleeve having a slit, into which a ferrule can be inserted, can be provided in the hole of the adaptor.

What is claimed is:

1. An optical connector for connecting optical fibers, comprising:
    an adaptor including a plug connecting section which has a plug body fitting portion and a holder fitting portion, and a stopping portion; and
    a connector plug to be connected to the plug connecting section of the adaptor, the connector plug including;
    a plug body to be fitted to the plug body fitting portion,
    a lock mechanism for locking the plug body to the plug body fitting portion when the plug body is fitted to the plug body fitting portion,
    a floating holder to be fitted to the holder fitting portion, the floating holder being arranged in the plug body to be movable in any direction in relation to the plug body and having an engaging section for engaging with the stopping section to lock the floating holder to the holder fitting portion when the floating holder is fitted to the holder fitting portion, and
    a ferrule attached to an end of the optical fiber and supported by the floating holder.

2. An optical connector according to claim 1, wherein said plug body has a holder receiving space which is open to the outer surface of the plug body, the floating holder is arranged in the holder receiving space with a certain gap, and the plug includes regulating means for preventing the holder from slipping out of the holder receiving space.

3. An optical connector according to claim 2, wherein said adaptor includes a body and a fitting element projecting from the body, the fitting element having an outer surface defining the plug body fitting portion and an inner surface defining the holder fitting portion, and said fitting element being formed in a shape which can be inserted into the holder receiving space.

4. An optical connector according to claim 3, wherein said fitting element is formed in a tubular shape, the outer surface of the fitting element having a profile similar to that of a cross section of the holder receiving space, and the inner surface of the fitting element having a profile similar to that of a cross section of the floating holder.

5. An optical connector according to claim 3, wherein said stopping section is formed on the inner surface on the fitting element, and the engaging section is formed on the outer surface of the floating holder.

6. An optical connector according to claim 2, wherein said regulating means includes a regulating recess formed in the plug body to open to the holder receiving space, and a regulating portion projecting from the floating holder and located in the regulating recess with a gap.

7. An optical connector according to claim 6, wherein said ferrule has an axis and a distal end portion projecting from the floating holder, and the floating holder and regulating portion are arranged in the holder receiving space and regulating recess, respectively, to be movable in a direction perpendicular to the ferrule axis and in the axial direction of the ferrule.

8. An optical connector according to claim 7, wherein said ferrule is arranged in the floating holder to be movable along the axis of the ferrule and having a stopper for preventing the ferrule from slipping out of the holder, and the floating holder includes an urging element for urging the ferrule in the direction in which the ferrule projects from the holder.

9. An optical connector according to claim 7, wherein said adaptor is provided with an insertion hole to which the distal end portion of the ferrule is inserted when the plug is connected to the adaptor.

10. An optical connector according to claim 1, wherein said lock mechanism includes a projection formed on the adaptor, and a lock lever mounted on the plug body and having a hole which engages with the projection when the plug is connected to the adaptor.

11. An optical connector according to claim 1, wherein said adaptor includes a second connecting section to which another optical connector plug is to be connected, the second connecting section opposing to the first connecting section.

12. An optical connector assembly comprising:

an optical fiber cable having a tension wire embedded in a jacket, an optical fiber, and a coating covering them, the coating having a distal end, and the tension wire and optical fiber having extended portions extending from the distal end of the coating;

an adaptor including a plug connecting section which has a plug body fitting portion and a holder fitting portion, and a stopping section; and a connector plug to be connected to the adaptor, the connector plug including;

a plug body to be fitted to the plug body fitting portion, the coating and the extended portion of the tension wire of the optical fiber cable being fixed to the plug body, a lock mechanism for locking the plug body to the plug body fitting portion when the plug body is fitted to the plug body fitting portion, a floating holder to be fitted to the holder fitting portion, the holder being arranged in the plug body to be movable in any direction in relation to the plug body and having an engaging section for engaging with the stopping section to lock the holder to the holder fitting portion when the holder is fitted to the holder fitting portion, and a ferrule attached to the extended end of the optical fiber and supported by the floating holder.

13. An optical connector according to claim 12, wherein said extended portion of the optical fiber is loose between the distal end of the coating of the optical fiber cable and the ferrule.

* * * * *